(12) United States Patent
Quintana et al.

(10) Patent No.: US 12,491,318 B2
(45) Date of Patent: Dec. 9, 2025

(54) DEVICES, SYSTEMS, AND METHODS FOR DELIVERING GAS

(71) Applicant: ALTAVIZ, LLC, Irvine, CA (US)

(72) Inventors: Quinton A. Quintana, Corona, CA (US); Nicolas Welche, Irvine, CA (US); Isabella L. Hidalgo, Irvine, CA (US); James E. Lescoulie, Mission Viejo, CA (US); Jack R. Auld, Laguna Niguel, CA (US)

(73) Assignee: ALCON INC, Fribourg (CH)

( * ) Notice: Subject to any disclaimer, the term of this patent is extended or adjusted under 35 U.S.C. 154(b) by 783 days.

(21) Appl. No.: 17/863,323

(22) Filed: Jul. 12, 2022

(65) Prior Publication Data

US 2023/0014573 A1     Jan. 19, 2023

Related U.S. Application Data

(60) Provisional application No. 63/220,917, filed on Jul. 12, 2021.

(51) Int. Cl.
*A61M 5/24* (2006.01)
*A61M 5/20* (2006.01)

(52) U.S. Cl.
CPC ........ *A61M 5/2448* (2013.01); *A61M 5/2033* (2013.01); *A61M 2005/206* (2013.01); *A61M 2005/2451* (2013.01)

(58) Field of Classification Search
CPC .............. A61M 5/2448; A61M 5/2033; A61M 2005/206; A61M 2005/2451; A61M 5/20;
(Continued)

(56) References Cited

U.S. PATENT DOCUMENTS 3,481,323 A    12/1969  Cook et al.
5,334,163 A     8/1994  Sinnett
(Continued)

FOREIGN PATENT DOCUMENTS

EP    2722025 A1    4/2014

OTHER PUBLICATIONS

Authorized Officer, Korean Intellectual Property Office, International Search Report for Corresponding International Application No. PCT/US2022/036871, Jan. 16, 2023, 5 pages.
(Continued)

*Primary Examiner* — Cris L. Rodriguez
(74) *Attorney, Agent, or Firm* — William A. English; Vista IP Law Group LLP (57) ABSTRACT

Devices and methods are provided for delivering gas. In one example, the device includes a syringe body including a proximal end, a distal end including an outlet and a gas chamber communicating with the outlet, and a plunger carrying a piston slidably received within the syringe body. A canister containing a gas is provided within the plunger adjacent a passage through the piston communicating with the gas chamber. A drive actuator is movable to cause an opener pin to open a septum of the canister and release the gas, whereupon the gas travels through the passage into the gas chamber, thereby displacing the piston proximally to fill the gas chamber. Once activated, the plunger may be advanced to deliver the gas within the gas chamber through the outlet into a patient's body, e.g., into an eye via a cannula connected to the outlet.

21 Claims, 7 Drawing Sheets

(58) Field of Classification Search
CPC .... A61M 13/00; A61M 5/3146; A61M 5/284; A61M 2205/8225
See application file for complete search history.

(56) References Cited

U.S. PATENT DOCUMENTS

| | | |
|---|---|---|
| 8,986,242 B2 | 3/2015 | Auld et al. |
| 9,693,895 B2 | 7/2017 | Auld et al. |
| 9,764,088 B2 | 9/2017 | Huculak et al. |
| 10,434,010 B2 | 10/2019 | Auld et al. |
| 10,610,351 B2 | 4/2020 | McCawley et al. |
| 11,224,537 B2 | 1/2022 | Auld et al. |
| 11,771,593 B2 | 10/2023 | Auld et al. |
| 2004/0035491 A1 | 2/2004 | Castellano |
| 2013/0345618 A1 | 12/2013 | Auld et al. |
| 2017/0312422 A1 | 11/2017 | Auld et al. |
| 2019/0167906 A1 | 6/2019 | Auld et al. |
| 2019/0175825 A1 | 6/2019 | McCawley et al. |
| 2020/0121499 A1 | 4/2020 | Auld et al. |
| 2021/0069426 A1 | 3/2021 | Huculak et al. |

OTHER PUBLICATIONS

Authorized Officer, Korean Intellectual Property Office, Written Opinion for Corresponding International Application No. PCT/US2022/036871, Jan. 16, 2023, 6 pages.

Korean Intellectual Property Office, International Search Report and Written Opinion for corresponding International Application No. PCT/US2022/036871, Jan. 16, 2025, 11 pages.

European Patent Office, Extended European Search Report for corresponding European Application No. 22842779.5-1122, Jan. 3, 2025, 11 pages.

Boult Wade Tennant LLP, Amendment/Response for corresponding European Application No. 22842779.5-1122, Jul. 21, 2025, 35 pages.

DEVICES, SYSTEMS, AND METHODS FOR DELIVERING GAS

RELATED APPLICATION DATA

The present application claims benefit of co-pending U.S. provisional application Ser. No. 63/220,917, filed Jul. 12, 2021, the entire disclosure of which is expressly incorporated by reference herein.

TECHNICAL FIELD

The present application relates to devices, systems, and methods for delivering agents into a patient's body and, more particularly, to injectors for delivering gases, e.g., pre-mixed within a patient's eye, and to systems and methods for using such injectors.

BACKGROUND

Various devices are available for delivering mixed gases into a patient's body, e.g., into the interior of the eye during a vitrectomy procedure. For example, reusable gas cylinders may be used for manually mixing and filling a syringe used to deliver the mixed gas. However, such manually mixed systems are complicated including multiple components, e.g., one or more filters, tubing, stopcocks, etc. to transfer the gases being mixed from the cylinders into the syringe. They also require multiple operators, typically a circulating nurse and scrub tech to coordinate the filling process, which can involve multiple purging cycles prior to gas filling. They also require manual calculation of gas and air volumes to provide the desired gas/air mix, which can risk injecting an incorrect, e.g., rich gas mixture, into the patient.

Systems are available that attempt to semi-automate syringe purging and gas filling, but still require the user to perform manual calculations of desired gas and air volumes to provide the desired gas/air mix.

Therefore, devices, systems, and methods that facilitate delivering gases into a patient's body would be useful.

SUMMARY

The present relates to devices, systems, and methods for delivering agents into a patient's body and, more particularly, to injectors for delivering gases, e.g., pre-mixed gases within a patient's eye, and to systems and methods for using such injectors.

In one example, the devices and systems herein may be provided as a ready-to-use and/or single-use syringe system to a user for delivering gas, e.g., pre-mixed gases such as twenty percent (20%) sulfur hexafluoride (SF6) or fourteen percent (14%) perfluoropropane (C3F8). The devices may include an internally housed source, e.g. a gas canister, filled with the pre-mixed gas, and/or may provide automatic syringe purging and filling upon activation.

The devices may provide one or more advantages over conventional systems. For example, in one example, the device may be used immediately after activation since pre-mixed gas is integrated into the device, i.e., via the gas canister. The devices herein may also provide increased mix ratio accuracy and/or decreased risk since manual gas mixing is eliminated. The devices may also maintain sterility and/or may only require one user, e.g., as compared to manual mixing systems. In addition, no external gas sources and/or other equipment or supplies may be needed given the self-contained nature of the devices.

In accordance with one example, a system is provided for delivering gas into a patient's body that includes a barrel comprising a proximal end, an enclosed distal end including an outlet, a longitudinal axis extending between the proximal and distal ends, and a gas chamber communicating with the outlet; a plunger slidably received within the syringe body comprising a piston within the barrel adjacent the distal end and a handle extending from the proximal end of the syringe body; a canister containing gas within the plunger adjacent a passage through the piston communicating with the gas chamber, the canister comprising a septum adjacent an opener pin; and a drive actuator comprising a first end adjacent the handle and a second end within the plunger adjacent the canister, the drive actuator movable to direct the second end distally to cause the opener pin to release the gas from the canister, whereupon the gas travels through the passage into the gas chamber, thereby displacing the piston proximally along the axis to fill the gas chamber with the gas.

In another example, a method is provided for preparing an injector device that includes providing a barrel comprising a proximal end, an enclosed distal end including an outlet and a gas chamber communicating with the outlet, a plunger slidably received within the barrel comprising a piston within the barrel adjacent the distal end, a gas canister filled with gas, a handle on the proximal end of the syringe body, and a drive actuator; and actuating the drive actuator to cause an opener pin to open a septum of the gas canister and release the gas from the canister, whereupon the gas travels through the piston into the gas chamber, thereby displacing the piston proximally to fill the gas chamber with the gas.

In yet another example, a method is provided for delivering gas into a patient's body that includes providing a barrel comprising a proximal end, an enclosed distal end including an outlet and a gas chamber communicating with the outlet; a plunger slidably received within the barrel comprising a piston within the barrel adjacent the distal end; a gas canister filled with gas; a handle extending from the proximal end of the syringe body; and a drive actuator; actuating the drive actuator to cause an opener pin to open a septum of the gas canister and release the gas from the canister, whereupon the gas travels through the piston into the gas chamber, thereby displacing the piston proximally to fill the gas chamber with the gas; introducing a tip of a cannula or needle communicating with the outlet into the patient's body; and advancing the plunger to deliver the gas within the gas chamber through the outlet into the patient's body.

Other aspects and features of the present invention will become apparent from consideration of the following description taken in conjunction with the accompanying drawings.

BRIEF DESCRIPTION OF THE DRAWINGS

It is believed the present invention will be better understood from the following description of certain examples taken in conjunction with the accompanying drawings, in which like reference numerals identify the same elements and in which.

The drawings are not intended to be limiting in any way, and it is contemplated that various examples of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Before the examples are described, it is to be understood that the invention is not limited to particular examples described, as such may, of course, vary. It is also to be understood that the terminology used herein is for the purpose of describing particular examples only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials are now described.

It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Figure 1A:
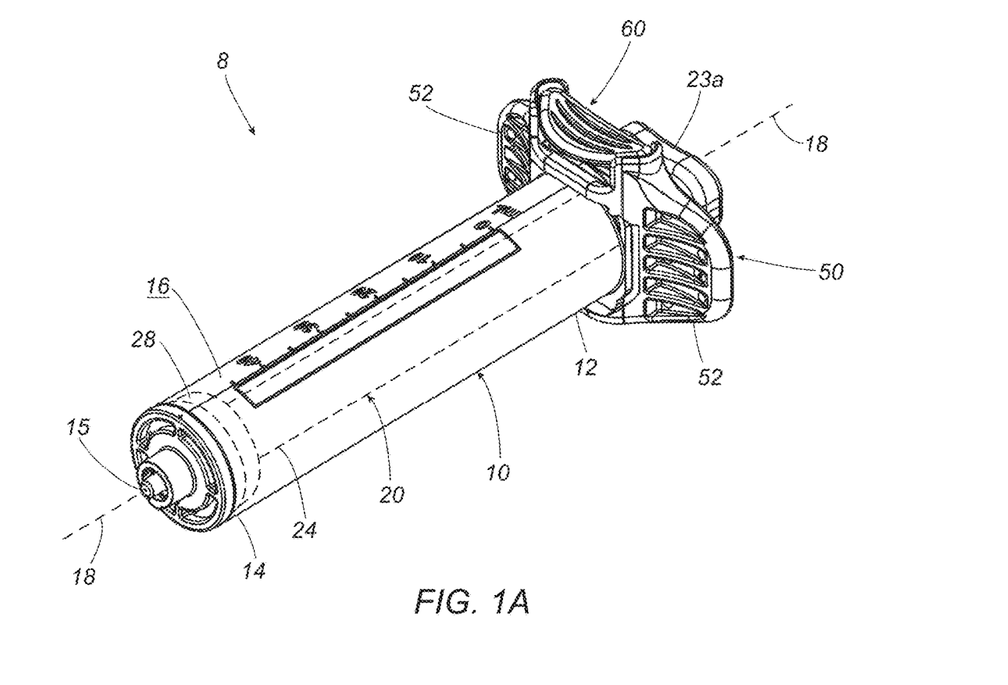
FIGS. 1A and 1B are perspective and side views, respectively, of an example of a pre-mixed gas delivery device.
Figure 1B:
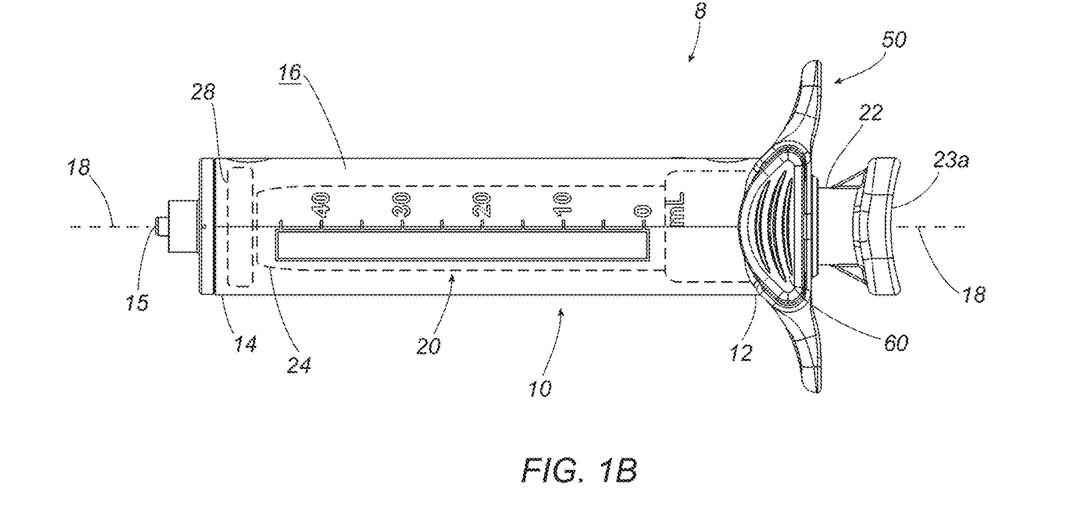

Turning to the drawings, FIGS. 1A and 1B show an example of a device or system 8 for delivering gas into a patient's body, e.g., for delivering pre-mixed gases such as about twenty percent (20%) sulfur hexafluoride (SF6) or about fourteen percent (14%) perfluoropropane (C3F8) into a patient's eye (not shown). Generally, the device 8 includes a syringe body or barrel 10 including an open proximal end 12 and an enclosed distal end 14, thereby defining a longitudinal axis 18 therebetween, and a gas chamber or interior 16 communicating with an outlet 15 in the distal end 14, e.g., which may be filled with pre-mixed gas automatically upon activation for delivery into an eye, as described further elsewhere herein.

Figure 2A:
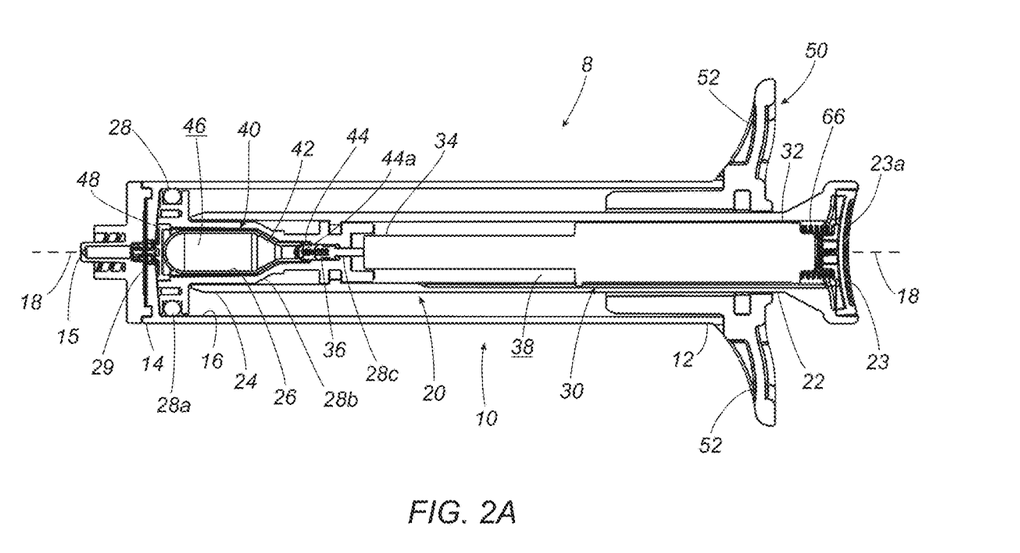
FIGS. 2A and 2B are longitudinal cross-sections of the device of FIGS. 1A and 1B before initial activation.
Figure 2B:
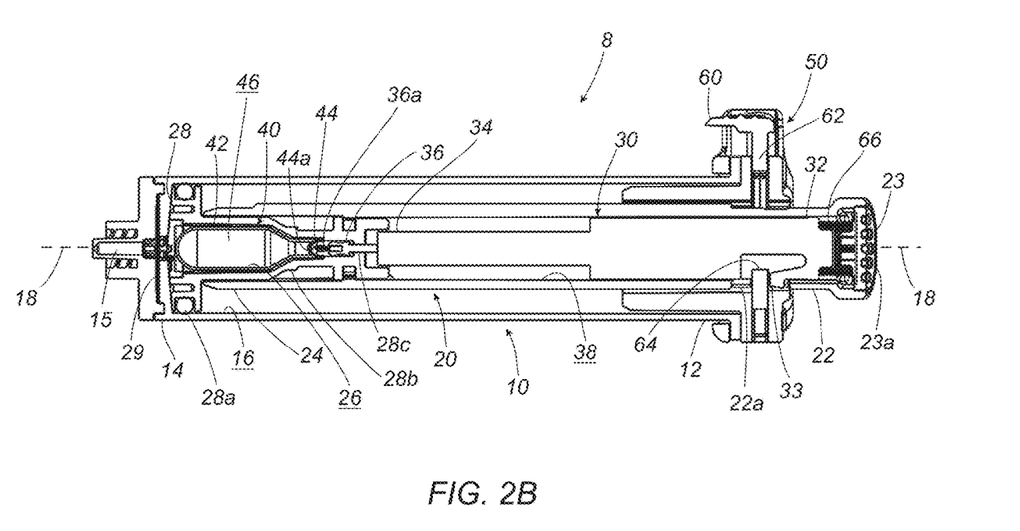

An elongate plunger 20 is slidably received within the barrel 10 that includes a proximal end 22, e.g., extending proximally from the proximal end 12 of the barrel 10, and a distal end 24 carrying a piston 28 that is slidable along an interior surface of the barrel 10, e.g., including one or more O-rings or other seals 28a to maintain a fluid-tight seal at the proximal end of the gas chamber 16. As shown in FIGS. 2A and 2B, the plunger 20 may be initially provided in a distal position with the piston 28 immediately adjacent the distal end 24 of the barrel 20, e.g., to minimize an interior volume of the gas chamber 16. As described further below, upon activation of the device 8, the plunger 20 may automatically move axially within the barrel 10, i.e., proximally towards a proximal position, such as that shown in FIG. 2C, when gas fills the gas chamber 16.

A canister 40 containing pre-mixed gas is provided within the plunger 20, e.g., within a cavity 26 adjacent the distal end 24 of the plunger 20 that is in fluid communication with the gas chamber 16, e.g., via one or more passages (one passage 48a shown) through the piston 28. Generally, the canister 40 includes an elongate body 42 including a closed first end, an open second end with a cap 44 welded or otherwise attached to the second end to enclose an interior 46 of the canister 40 The cap 44 includes a septum 44a that may be penetrated or otherwise opened, e.g., by an opener pin 36a, as described further elsewhere herein. For example, the septum 44a may include a thin-walled or weakened region, e.g., extending at least partially around a perimeter of the cap 44 or a relatively thin central region (not shown) and the pin 36a may be a puncture pin including a beveled tip configured to cause the septum 44a to tear. Alternatively, the puncture pin may include a pointed, sharpened, or other tip (not shown) configured to pierce or tear the septum 44a. In a further alternative, the septum may be formed using other sealing members that may be penetrated or displaced by the opener pin 36a to release the gas within the interior 46.

The interior 46 maybe filled with the gas at a desired pressure, e.g., such that, upon activation of the device 8, the gas chamber 16 is automatically filled with the gas, as described further elsewhere herein. Examples of canisters that may be included in the devices and systems herein are disclosed in U.S. Pat. No. 10,610,351, the entire disclosure of which is expressly incorporated by reference herein.

Figure 2C:
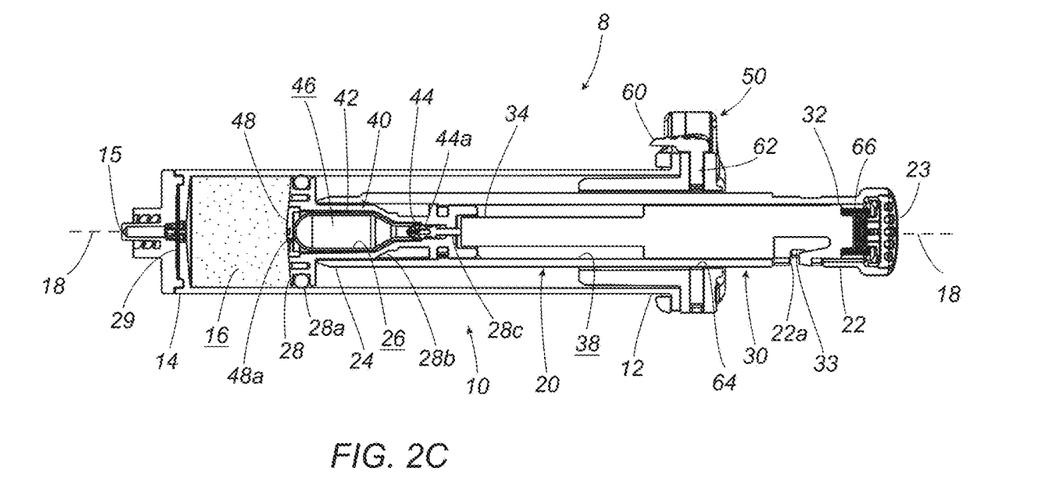
FIG. 2C is a longitudinal cross-section of the device of FIGS. 1A and 1B after initial activation.

In the example shown in FIGS. 2A-2C, the canister 40 may be received in the cavity 26 via an opening in the piston 28, e.g., such that the septum 44a is oriented proximally. For example, the piston 28 may include a tubular extension 28b that extends proximally within the plunger 20 and defines walls of the cavity 26, e.g., having contours similar to the body 42 of the canister 40. The extension 28b may be integrally molded or otherwise formed with the piston 28 and secured relative to the plunger 20 such that the piston 28 and canister 40 within the cavity 26 are coupled to movement of the plunger 20. Alternatively, the cavity may be formed within the distal end 24 of the plunger 20 and the piston 28 may be a separate member attached to the distal end 24 (not shown). Optionally, the walls of the cavity 26 may include one or more ribs, tabs, and the like (not shown) to support the canister 40, e.g., to prevent lateral movement, while providing a flow path around the canister 40 for the pre-mixed gas.

Figure 2D:
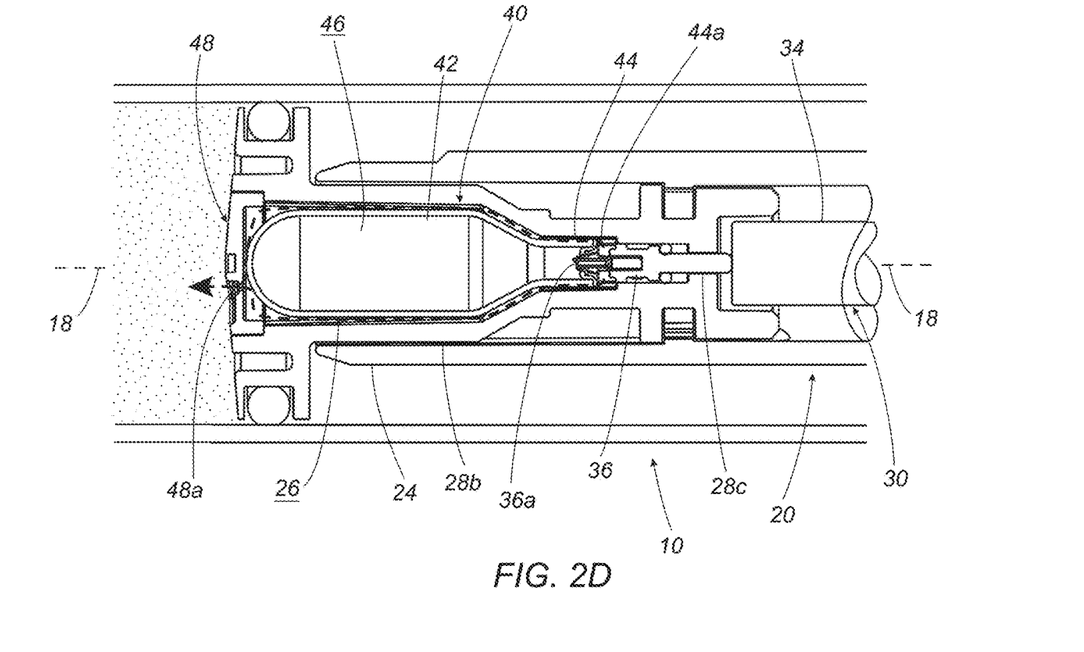
FIG. 2D is a detail of the device of FIGS. 1A and 1B showing a flow path of gas delivered from a gas canister into a gas chamber of the device once activated.
Figure 3A:
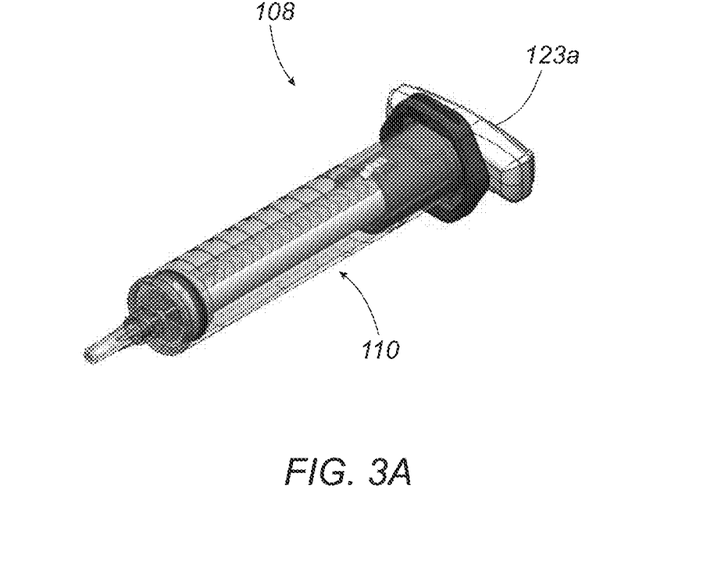
FIGS. 3A and 3B are perspective and side views, respectively, of another example of a pre-mixed gas delivery device.
Figure 3B:
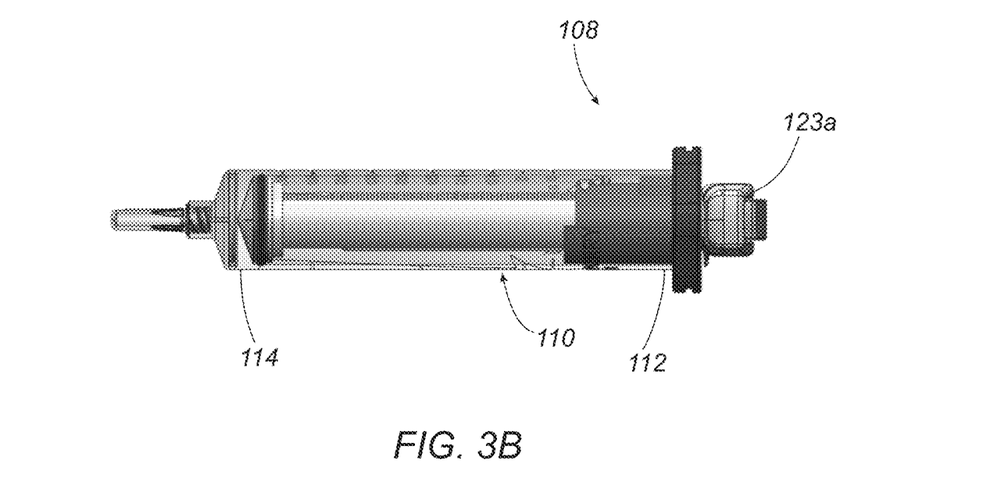

In the example shown in FIGS. 2A-2D, a cap 48 may be attached to the piston 28, e.g., during manufacturing or other final assembly, to enclose the cavity 26 and prevent removal or other axial movement of the canister 40. The cap 48 may include a passage 48a therethrough to deliver the pre-mixed gas within the cavity 26 into the gas chamber 16. The cap 48 may be attached to the piston 28, e.g., substantially permanently, using one or more of bonding with adhesive, sonic welding, and one or more connectors, e.g., cooperating grooves, detents, threads, and the like (not shown). FIG. 2D shows a series of arrows representing an exemplary flow path of the pre-mixed gas from the interior 46 of the canister 40 (through the opened septum 44a), through the cavity 26 around the body 42 of the canister 40 and into the gas chamber 16 via the passage 48a.

The plunger 20 also includes a drive actuator shaft 30 slidably disposed therein, e.g., within a chamber 38 extending between the proximal and distal ends 22, 24 of the plunger 20. The shaft 30 includes a first or proximal end 32 disposed adjacent the proximal end 22 of the plunger 20 and a second or distal end 34 disposed adjacent the canister 40. An element 36 is carried on the second end 34 for opening the septum 44a, e.g., an opener pin 36a extending distally from the second end 34, e.g., that extends through an opening 28c in the tubular extension 28b housing the canister 40 such that the pin 36a is initially spaced apart from the septum 44a of the canister 40. The distal end 34 of the shaft 30 and/or the tubular extension 28b may include one or more seals (not shown), e.g., to prevent gas released from the canister 40 passing proximally into the chamber 38 of the plunger 20.

The drive actuator shaft 30 is movable, e.g., distally within the chamber 38 of the plunger 20, to direct the second end 34 distally to cause the opener pin 36a to open the septum 44a and release the pre-mixed gas from the canister 40. For example, the drive actuator shaft 30 may be initially constrained in a proximal position, i.e., with the opener pin 36a spaced apart proximally from the septum 44a, e.g., as shown in FIG. 2A, but may be biased to move distally within the plunger 20 towards a distal position, e.g., as shown in FIG. 2B. Upon activation of the device 8, the shaft 30 may automatically move axially towards the distal position shown in FIG. 2B to cause the opener pin 36a to open the septum 44a and release the mixed-gas therein to fill the gas chamber 16, as described further elsewhere herein.

For example, as shown, the device 8 may include a handle 50 on the proximal end 22 of the barrel 10, i.e., that is substantially stationary relative to the barrel 10, and an actuation button 60 on the handle 50 coupled to the drive actuator shaft 30 that may be actuated by the user to release the shaft 30. In the example shown in FIGS. 1A-2B, the handle 50 includes a pair of finger grips, wings, or other features 52 extending transversely relative to the axis 18 from the proximal end 22, e.g., to facilitate holding and manipulating the device 8 during use. The actuation button 60 may be mounted on the handle 50 such that the button 60 may be depressed by the user, e.g., using their thumb while the index and middle fingers hold the grips 52.

As best seen in FIGS. 2B and 2C, the button 60 may be coupled to a locking member 62 extending into the handle 50, e.g., partially around the barrel 20, that is initially coupled to the drive actuator shaft 30 to lock the shaft 30 in its initial proximal position. For example, the locking member 62 may include a detent, tab, or other feature 64 that may be received in a recess, slot, or other corresponding feature 33 in the proximal end 32 of the drive actuator shaft 30, e.g., through an opening 22a in the wall of the plunger 20 to prevent movement of the shaft 30. A spring or other resilient member 66 may be provided within the proximal end 22 of the plunger 20, e.g., between the proximal end 32 of the shaft 30 and a closed end 23 of the plunger 20, that may bias the shaft 30 to move distally but for the locking member 62. When the actuation button 60 is depressed, e.g., pressed transversely relative to the longitudinal axis 18, the locking member 62 may move, releasing the features 64, 33, whereupon the spring 66 may automatically direct the shaft 30 distally, causing the opener pin 36a to open the septum 44a, whereupon pre-mixed gas within the canister 40 travels through the flow path into the gas chamber 16. For example, as shown in FIGS. 2B and 2C, depression of the actuation button 60 causes the detent 64 to move transversely out of the recess 33 in the plunger 30, thereby releasing the plunger 30 and allowing the spring 66 to advance the plunger 30 distally.

Once the pre-mixed gas has been released from the interior 46 of the canister 40, the piston 28 and plunger 20 may be displaced axially, i.e., proximally within the barrel 10, as the gas chamber 16 fills with the pre-mixed gas, e.g., automatically under the pressure of the pre-mixed gas within the canister 40. In addition, the pressure of the pre-mixed gas may displace any residual air within the gas chamber 16 through the outlet 15 as the gas chamber 16 fills with the pre-mixed gas. The pressure and/or volume of the pre-mixed gas within the canister 40 may fill the gas chamber 16 with a predetermined volume with excess gas vented through the outlet 15 to provide the volume at atmospheric pressure. In one example, the pressure of the pre-mixed gas within the canister 40 may be set such that the gas chamber 16 fills with about fifty milliliters (40 mL) of pre-mixed gas at atmospheric pressure, with the only action required of the user being depressing the actuation button 60.

Optionally, a filter 29 may be provided adjacent the outlet 15, e.g., against or within the distal wall 14 of the barrel or within the gas chamber 16, for filtering pre-mixed gas exiting the gas chamber 16 through the outlet 15. This filter 29 may have a pore size of about 0.22 µm or less, e.g., to filter out bacteria so that the gas is considered sterile. Alternatively, a separate filter may be attached to the outlet 15, e.g., to a Luer fitting or other connector provided on the distal end 14 of the barrel 10.

Once the device 8 is actuated and the gas chamber 16 filled with mixed gas, a needle or other cannula (not shown) may be connected to the distal end 14 of the barrel 10 to allow delivery into the patient, e.g., to a Luer fitting or other connector provided on the distal end 14 that communicates with the outlet 15. Alternatively, a needle or other cannula may be integrally provided on the distal end 14 of the barrel 10, e.g., molded into or otherwise permanently attached to the barrel 10, if desired.

Optionally, the barrel 10 may include one or more demarcations indicating the volume of gas within the gas chamber 16 that has been delivered into the patient. For example, when the plunger 20 retracts during filling, the piston 28 may automatically become aligned with a "0" or other initial volume indicator. The user may then simply depress the plunger 20, e.g., by pressing on a thumb rest or other feature 23a on the proximal end 22, to deliver the pre-mixed gas from the gas chamber 16 into the patient, using the demarcations to confirm the volume being delivered.

Alternatively, other configurations of activation may be provided. For example, turning to FIGS. 3A-4C, another example of a device 108 is shown that includes a barrel 110, plunger 120 with piston 128, a drive actuator shaft 130, and a canister 140, generally similar to the device 8 (with reference nos. of similar features increased by 100). In this example, however, an opener pin 136 is provided that is mounted to the piston 128, i.e., such that the opener pin 144a is located distal to the canister 140, is oriented proximally, and is substantially stationary relative to the plunger 120. The canister 140 is oriented such that the septum 144a is oriented distally but still initially spaced apart from the opener pin 144a. For example, the canister 140 may be received within a cavity 126 of a tubular extension 128b integrally formed with or otherwise extending proximally from the piston 128 within a chamber 138 in the plunger 120, e.g., similar to the device 8. However, with this device 108, the canister 140 is movable axially within the chamber 126.

For example, the canister 140 may be provided initially within the chamber 126 such that the septum 144a is spaced apart proximally from the opener pin 136. A drive actuator shaft 130 is provided within the plunger 120 that includes a proximal end 132 adjacent the plunger proximal end 122 and a distal end 134 that is located immediately adjacent the canister 140. For example, the distal end 134 may include a concave or other shape similar to the first end of the canister body 142 such that the distal end 134 may abut the body 142 in the initial position.

The device 160 includes an actuation button 160 coupled to the proximal end 132 of the drive actuator shaft 130 such that, when the button 160 is depressed, e.g., pushed distally, the shaft 130 is released whereupon the distal end 134 advances distally to direct the canister 140 distally until the opener pin 136 opens the septum 144a. The piston 128 may include one or more passages, e.g., passage 128a, therethrough to deliver the gas released from the canister 140 therethough into the gas chamber 116. As the chamber 116 fills, the plunger 120 and internal components, i.e., shaft 130 and canister 140, may retract proximally until the chamber 116 is filled, similar to the device 8. The plunger 120 may then be advanced, e.g., by pressing a thumb rest or other feature 123a on the proximal end 122 to deliver the gas from the chamber 116 through the outlet 115 into the patient's body.

Figure 4A:
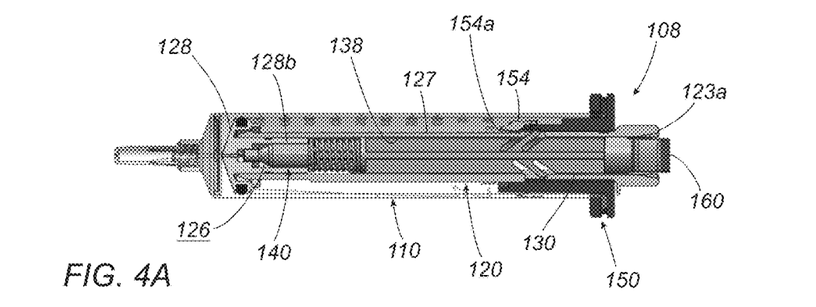
FIGS. 4A and 4B are longitudinal cross-section of the device of FIGS. 3A and 3B before and after initial activation, respectively.
Figure 4B:
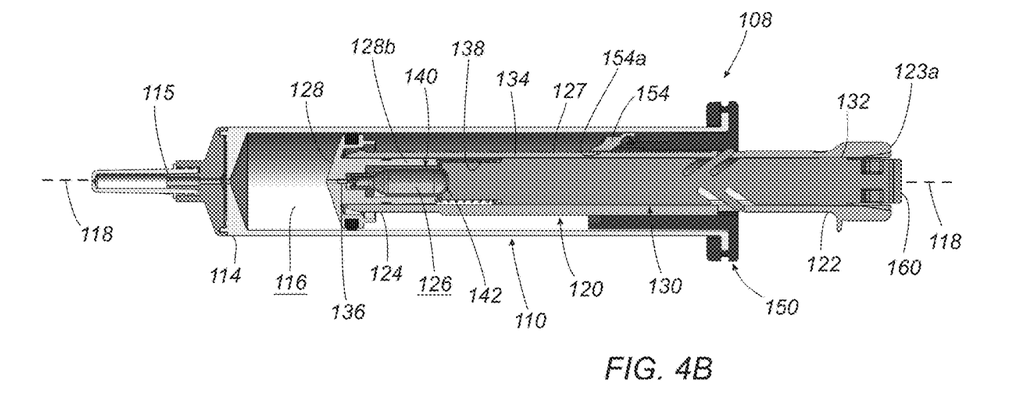
Figure 4C:
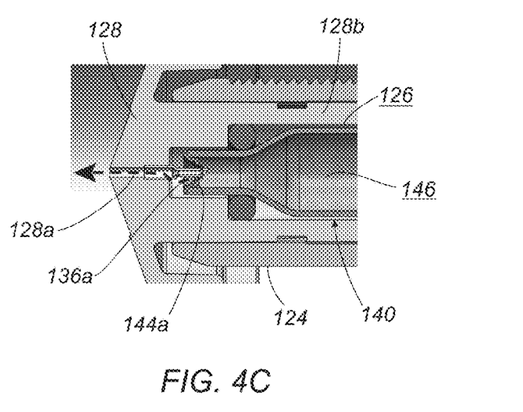
FIG. 4C is a detail of the device of FIGS. 3A and 3B showing a flow path of gas delivered from a gas canister into a gas chamber of the device once activated.

Optionally, any of the devices herein may include a locking mechanism configured to engage and lock the plunger from moving proximally once the gas chamber is filled with pre-mixed gas. For example, as shown in FIGS. 4A and 4B, a ratchet mechanism may be provided on the plunger 120 that remains in a passive state as the plunger 120 moves proximally (during filling) and becomes engaged when the plunger 120 is directed to a proximal position, thereby locking the plunger 120 relative to the barrel 110 with the gas chamber 116 filled. For example, the plunger 120 may include a plurality of ratchet or engagement elements 127, e.g., on a rack formed in or attached to an outer surface of the plunger 120 that extend axially along a portion of the plunger 120. A pawl member 154 including one or more ratchet or engagement elements 154a may be mounted within the barrel 110 that may interact with the elements 127 on the plunger 120. For example, the pawl member 154 may be initially spaced apart from the plunger 120, e.g., as shown in FIG. 4A, such that the plunger 120 may retract freely while the gas chamber 116 fills. Once the chamber 116 is filled, the pawl member 154 may engage such that the elements 127, 154a prevent further proximal movement of the plunger 120. Thus, the ratchet mechanism may prevent the plunger 120 from being pulled proximally after initial activation (and gas release and filling of the chamber 116), thereby preventing the user from modifying delivery, which may otherwise affect the mix ratio of the pre-mixed gas delivered from the gas chamber 116.

Figure 5A:
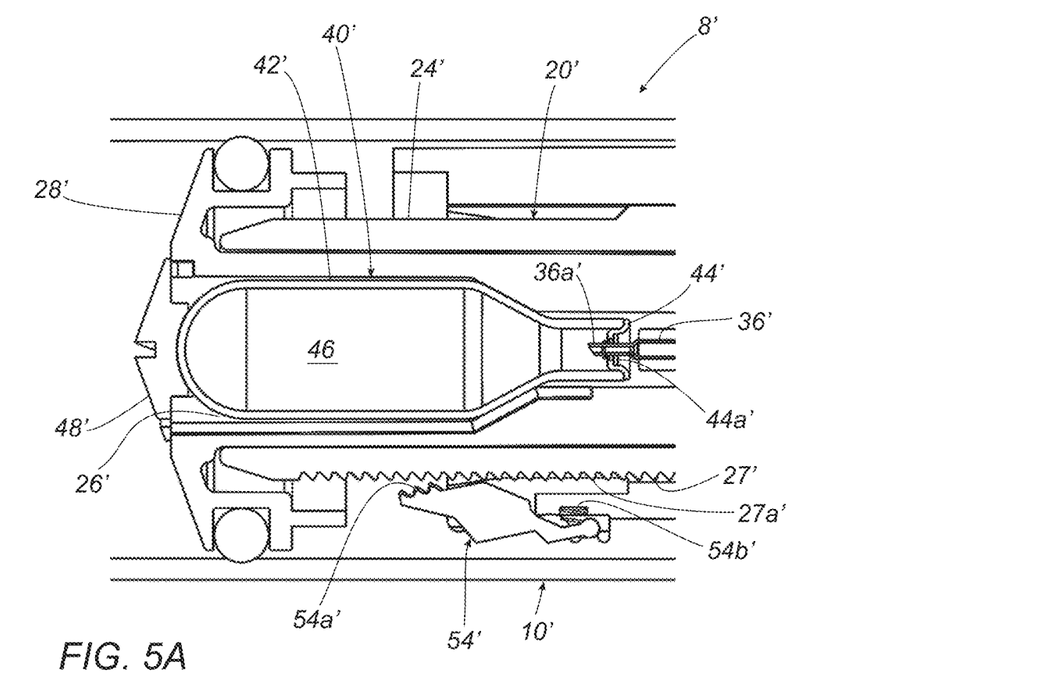
FIGS. 5A-5C are details of an alternative device including a pawl and ratchet mechanism.
Figure 5B:
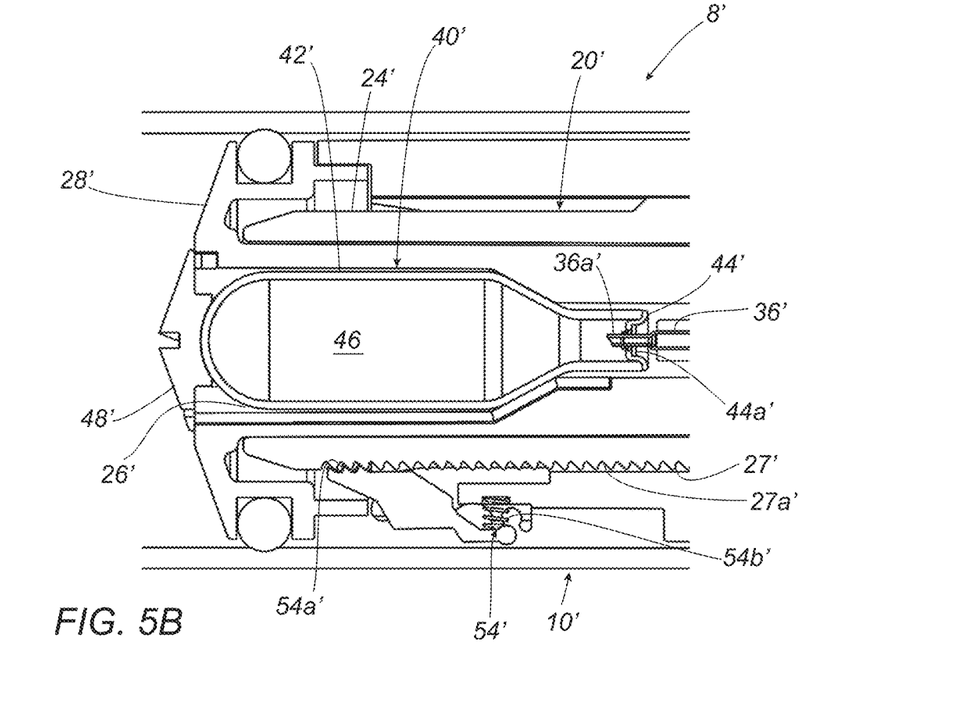
Figure 5C:
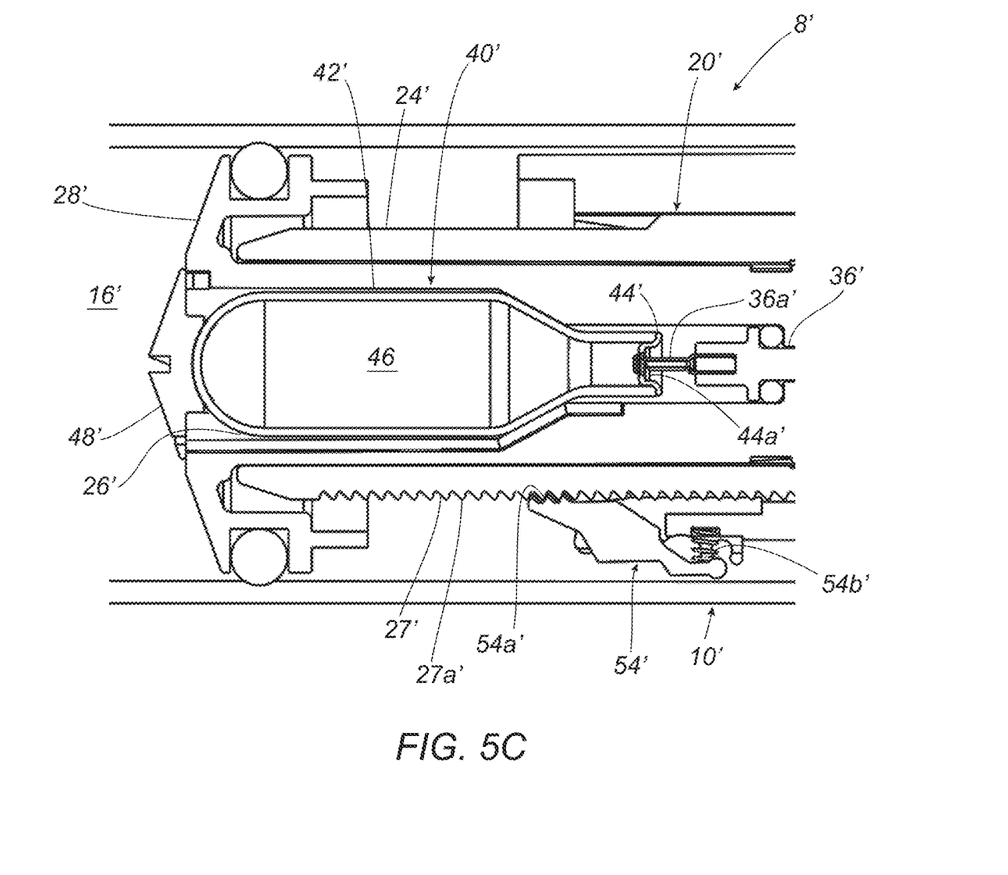

FIGS. 5A-5C show details of an alternative device 8', e.g., generally similar to device 8, but including a pawl member 54' and ratchet 27', which may operate similar to the ratchet mechanism shown in FIGS. 4A and 4B. As shown in FIG. 5A, the pawl member 54' may be pivotally mounted to the barrel 10' and the ratchet 27' may be on the plunger 20.' The pawl member 54' be initially held in an inactive position in which teeth 54a' are spaced away from teeth 27a' of the ratchet 27.' When the actuation button 60 is activated, the plunger 20' may retract as the gas is released from the canister 60 and, once filled, the pawl member 54' may be released. The pawl member 54' may be biased, e.g., by spring or other resilient member 54b' to pivot inwardly to engage the teeth 54a', 27a,' e.g., as shown in FIG. 5B. The teeth 54a', 27a' may include blunt proximal edges, thereby preventing the plunger 20' from additional proximal movement. In addition, the teeth 54a,' 27a' may include tapered distal edges such that during delivery of gas from the device 8,' the pawl member 54' may slide over the ratchet 27' as the plunger 20' is advanced. Thus, the pawl 54' and ratchet 27' may prevent removal of the plunger 20' without interfering with delivery of the gas filling the gas chamber 16.'

The devices and systems herein may be used to deliver the pre-mixed gas into a patient's body, e.g., into the interior of the patient's eye during a vitrectomy procedure, similar to the methods disclosed in U.S. Pat. No. 8,986,242, the entire disclosure of which is expressly incorporated by reference herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

We claim:

1. A system for delivering gas, comprising:
   a barrel comprising a proximal end, an enclosed distal end including an outlet, a longitudinal axis extending between the proximal and distal ends, and a gas chamber communicating with the outlet;
   a plunger slidably received within the syringe body comprising a piston within the barrel adjacent the distal end and a handle extending from the proximal end of the syringe body;
   a canister containing gas within the plunger adjacent a passage through the piston communicating with the gas chamber, the canister comprising a septum adjacent an opener pin; and
   a drive actuator comprising a first end adjacent the handle and a second end within the plunger adjacent the canister, the drive actuator movable to direct the second end distally to cause the opener pin to release the gas from the canister, whereupon the gas travels through the passage into the gas chamber, thereby displacing the piston proximally along the axis to fill the gas chamber with the gas.

2. The system of claim 1, further comprising a filter adjacent the outlet for filtering gas exiting the gas chamber through the outlet.

3. The system of claim 2, wherein the filter has a pore size to filter out bacteria so that the gas is considered sterile.

4. The system of claim 2, wherein the filter has pore size of about 0.22 μm or less.

5. The system of claim 1, wherein the drive actuator comprises an activation button extending from the handle of the plunger, the button actuatable to direct the drive actuator distally to displace one of the canister and the opener pin to cause the opener pin to open the septum.

6. The system of claim 5, wherein the activation button is movable transversely relative to the longitudinal axis.

7. The system of claim 6, wherein the drive actuator is locked in a proximal position by the activation button and biased to a distal position such that movement of the activation button releases the driver actuator such that the drive actuator automatically moves towards the distal position to release the gas from the canister.

8. The system of claim 5, wherein the canister is received within a cavity in the plunger such that the septum is oriented proximally, and wherein the opener is positioned proximal to and spaced from the septum in an initial position.

9. The system of claim 8, wherein, upon activation of the actuation button, the drive actuator advances distally to direct the opener pin distally to open the septum.

10. The system of claim 5, wherein the canister is received within a cavity in the plunger such that the septum is oriented distally, and wherein the opener is positioned distal to and spaced from the septum in an initial position.

11. The system of claim 10, wherein, upon activation of the actuation button, the drive actuator advances distally to direct the canister distally to cause the opener pin to open the septum.

12. The system of claim 1, wherein the gas is a pre-mixed gas.

13. The system of claim 12, wherein the pre-mixed gas comprises one of sulfur hexafluoride (SF6) or octafluoropropane (C3F8).

14. The system of claim 12, wherein the pre-mixed gas comprises about twenty percent (20%) sulfur hexafluoride (SF6).

15. The system of claim 12, wherein the pre-mixed gas comprises about fourteen percent (14%) or octafluoropropane (C3F8).

16. The system of claim 1, wherein the gas is provided under pressure such that, when the septum is opened, the gas displaces residual air within the gas chamber through the outlet as the gas chamber fills with the gas.

17. The system of claim 16, wherein the gas canister is configured to fill the gas chamber with a predetermined volume of gas.

18. The system of claim 1, further comprising a locking mechanism configured to engage the plunger once the gas chamber is filled with the gas.

19. The system of claim 18, wherein the gas is a pre-mixed gas, and wherein the locking mechanism comprises a spring and rack configured such that, once the gas chamber is filled with the pre-mixed gas, the rack prevents proximal movement of the plunger as to not affect the pre-mixed gas ratio during dispensing of the pre-mixed gas.

20. A method for preparing an injector device, comprising:
   providing a barrel comprising a proximal end, an enclosed distal end including an outlet and a gas chamber communicating with the outlet; a plunger slidably received within the barrel comprising a piston within the barrel adjacent the distal end; a gas canister filled with gas; a handle on the proximal end of the syringe body; and a drive actuator; and
   actuating the drive actuator to cause an opener pin to open a septum of the gas canister and release the gas from the canister, whereupon the gas travels through the piston into the gas chamber, thereby displacing the piston proximally to fill the gas chamber with the gas;
   delivering gas into a patient's body that includes providing a barrel comprising a proximal end, an enclosed distal end including an outlet and a gas chamber communicating with the outlet, a plunger slidably received within the barrel comprising a piston within the barrel adjacent the distal end, a gas canister filled with gas, a handle extending from the proximal end of the syringe body, and a drive actuator; actuating the drive actuator to cause an opener pin to open a septum of the gas canister and release the gas from the canister, whereupon the gas travels through the piston into the gas chamber, thereby displacing the piston proximally to fill the gas chamber with the gas; introducing a tip of a cannula or needle communicating with the outlet into the patient's body; and advancing the plunger to deliver the gas within the gas chamber through the outlet into the patient's body.

21. A method for delivering gas into a patient's body, comprising:
   providing a barrel comprising a proximal end, an enclosed distal end including an outlet and a gas chamber communicating with the outlet, a plunger slidably received within the barrel comprising a piston within the barrel adjacent the distal end, a gas canister filled with gas, a handle extending from the proximal end of the syringe body, and a drive actuator;
   actuating the drive actuator to cause an opener pin to open a septum of the gas canister and release the gas from the canister, whereupon the gas travels through the piston into the gas chamber, thereby displacing the piston proximally to fill the gas chamber with the gas;
   introducing a tip of a cannula or needle communicating with the outlet into the patient's body; and advancing the plunger to deliver the gas within the gas chamber through the outlet into the patient's body.

* * * * *